United States Patent
Roderique

(10) Patent No.: US 7,631,099 B2
(45) Date of Patent: Dec. 8, 2009

(54) PROXY SUPPORT OF MOBILE IP

(75) Inventor: William John Roderique, Lynchburg, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 1214 days.

(21) Appl. No.: 10/414,904

(22) Filed: Apr. 16, 2003

(65) Prior Publication Data

US 2004/0249952 A1 Dec. 9, 2004

(51) Int. Cl.
G06F 15/16 (2006.01)
(52) U.S. Cl. ............... 709/245; 709/224; 709/229; 709/238; 370/401; 455/433
(58) Field of Classification Search ............ 709/245, 709/238, 224, 229; 370/338, 401; 455/433, 455/432.1, 435.1
See application file for complete search history.

(56) References Cited

U.S. PATENT DOCUMENTS

| | | | |
|---|---|---|---|
| 6,230,012 B1 | 5/2001 | Willkie et al. | 455/435 |
| 6,466,964 B1 | 10/2002 | Leung et al. | 709/202 |
| 6,707,809 B1 * | 3/2004 | Warrier et al. | 370/351 |
| 6,742,036 B1 * | 5/2004 | Das et al. | 709/226 |
| 6,795,857 B1 * | 9/2004 | Leung et al. | 709/224 |
| 7,284,057 B2 * | 10/2007 | Kulkarni et al. | 709/227 |
| 2001/0021175 A1 * | 9/2001 | Haverinen | 370/230 |
| 2002/0006133 A1 * | 1/2002 | Kakemizu et al. | 370/401 |
| 2002/0066036 A1 | 5/2002 | Makineni et al. | 713/201 |
| 2002/0147837 A1 * | 10/2002 | Heller | 709/238 |
| 2003/0224788 A1 * | 12/2003 | Leung et al. | 455/435.1 |
| 2004/0114559 A1 * | 6/2004 | Wang | 370/338 |
| 2004/0203749 A1 * | 10/2004 | Iyer et al. | 455/432.1 |
| 2004/0213260 A1 * | 10/2004 | Leung et al. | 370/395.3 |
| 2007/0091842 A1 * | 4/2007 | Siddiqi et al. | 370/331 |

FOREIGN PATENT DOCUMENTS

| CN | 1395769 A | 2/2003 |
|---|---|---|
| WO | WO 02/065731 A2 | 8/2005 |

OTHER PUBLICATIONS

WO 02/065731 A (Meier Peter Siegfried; Royds Ian Douglas (NZ); Tait Electronics LRD () Aug. 22, 2002 p. 4, line 1—p. 6, line 17; figure 3.
C. Perkins_Nokia Research Center: "IP" mobility support for IPv4 IETF—RFC 3344, Aug. 2002, XPO15009105.

* cited by examiner

Primary Examiner—Lashonda T Jacobs
(74) Attorney, Agent, or Firm—Harris Corporation; Michael S. Yatsko, Esq.

(57) ABSTRACT

A proxy is utilized to limit the RF bandwidth needed for foreign IP registration. An existing RF log-in procedure causes the proxy to initiate and complete the foreign IP registration procedure with the foreign agent at the RF site where the mobile node is located. The proxy then acts as a locally connected (i.e., direct ethernet connected) device for each IP address for which it is proxying, and thus there is no need to use RF to register a mobile with the active foreign agent. This allows the use of off-the-shelf home and foreign agents to complete the mobile IP architecture, and reduces the RF bandwidth used, since the RF portion of the registration process (the registration between the active foreign agent and the mobile) is reduced.

15 Claims, 4 Drawing Sheets

PROXY SUPPORT OF MOBILE IP

FIELD OF THE INVENTION

This invention is generally related to the field of two-way radio communications, and more particularly, relates to mobile IP networking via two-way radio communication systems.

BACKGROUND OF THE INVENTION

The definition of "mobile computing" has evolved, and continues to evolve, in step with the advances that are occurring in mobile communications. In the 1990's, mobile computing would likely have described merely the use of a laptop computer. A laptop computer gave the computer user the ability to easily transport a keyboard, monitor, computer processor and memory from one location to the next so that multiple desktop computers (e.g., one at the office and one at home) were not necessary. Battery-powered laptop computers made it possible for the user to operate the computer at locations away from regular A/C power sources, such as on a plane or train, or at a remote location (e.g., a construction work site).

As computer networking developed, mobile computing took on a slightly new meaning. With the ability to connect to an office network using a modem and telephone line connection, a user was able to access a centralized network from remote locations. Thus, mobile computing could involve a laptop connected from a telephone line in a hotel room in New York to a network system of a corporate headquarters in Tokyo, Japan. The user could then disconnect the telephone connection, travel to Chicago, set up the laptop in a similar fashion and communication with the Tokyo office via a phone line connection from a hotel room in Chicago.

Along the way, cellular telephony became commonplace. Using cellular telephones, a user could travel from place to place with a wireless connection to the telephone system, so that, regardless of location, they could be reached at a single telephone number and could carry on the communication while moving from one location to another. It was only a matter of time before mobile computing would seek to have the same kind of connectivity.

Today, mobile computing includes the continuous wireless connectivity to an IP-based network with the ability to roam from point A to point B while maintaining the connection and ability to communicate over the connection. To assist in the development of mobile IP, the Internet Engineering Task Force (IETF) developed and continues to develop a set of protocols, referred to as "RFCs", governing mobile IP operation. These protocols establish a system for keeping track of mobile systems ("mobiles") in a wireless IP network, allowing a mobile to change its "point of attachment" to the network without losing its ability to communicate over the network. The most recent RFC related to tracking mobiles in a wireless IP network, RFC 3344, which updates and obsoletes RFC 3344, which updated and obsoleted RFC 2002.

These protocols, among other things, established a system whereby each mobile node uses two IP addresses: a fixed home address and a "care-of" address that changes at each new point of attachment. Through the use of a router associated with the home address (called a "home agent") and routers associated with the care-of addresses (called "foreign agents"), the location of the mobile node can be established, and datagrams and other forms of data destined for a particular mobile node at its fixed home address can be forwarded to the care-of address that has been associated with that fixed home address.

The system described in RFC 3344 is well known and operates adequately. However, mobile IP, as it exists in the RFCs today, requires that a registration procedure be performed by the roaming IP device with the "active" foreign agent (the foreign agent with which a particular roaming IP device is registered at a given time). This registration process uses precious RF bandwidth. Accordingly, it would be desirable to have a mobile IP system whereby the use of RF bandwidth for registration is minimized.

SUMMARY OF THE INVENTION

In accordance with the present invention, a proxy is utilized to limit the RF bandwidth needed for foreign IP registration. An existing RF log-in procedure causes the proxy to initiate and complete the foreign IP registration procedure with the foreign agent at the RF site where the mobile node is located. The proxy then acts as a locally connected (i.e., direct ethernet connected) device for each IP address for which it is proxying, and thus there is no need to use RF to register a mobile with the active foreign agent. This allows the use of off-the-shelf home and foreign agents to complete the mobile IP architecture, and reduces the RF bandwidth used, since the RF portion of the registration process (the registration between the active foreign agent and the mobile) is reduced.

DETAILED DESCRIPTION OF THE PREFERRED EMBODIMENT

Figure 1:
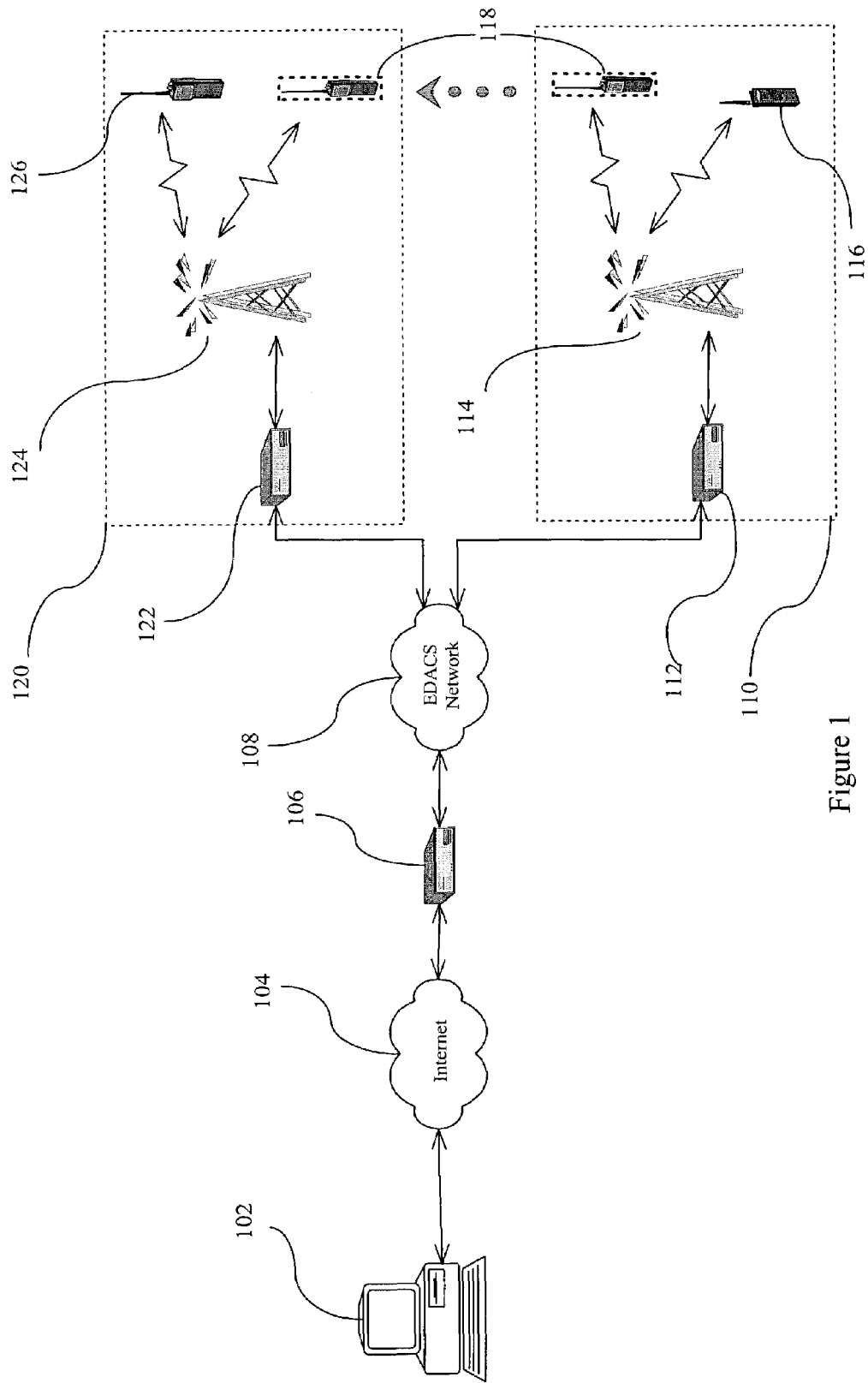
FIG. 1 is a functional block diagram illustrating the architecture of the prior art.

FIG. 1 is a functional block diagram illustrating the architecture of the prior art. As shown in FIG. 1, a host computer 102 is connected to the Internet 104 and provides content to users of the Internet in a well-known manner. A home agent 106 is connected to the wireless network (e.g., a EDACS network) 108.

A first RF site 110 includes a foreign agent 112 coupled to the network 108 and a radio tower 114 for broadcasting datagrams or other data to mobiles within range. In FIG. 1, a first mobile 116 and a second mobile 118 are illustrated as being within range of RF tower 114. With the mobiles 116 and 118 within range of RF tower 114, foreign agent 112 is the active foreign agent with respect to mobiles 116 and 118.

A second RF site 120 includes a foreign agent 122 coupled to a radio tower 124. Mobile 118 is shown as progressing from RF site 110 to RF site 120, which will be described in more detail below. RF site 120 also has a third mobile 126 located within the broadcast range of RF tower 124. With mobile 126 within range of RF tower 124, foreign agent 122 is the active foreign agent with respect to mobile 126, and when mobile 118 gets within range of RF tower 124, foreign agent 122 will become the active foreign agent for mobile 118 and foreign agent 112 will cease to be its active foreign agent.

For the purpose of this example it is assumed that mobile 118 begins at RF site 110. As is well known, under the protocol established in RFC 3344 each mobile is assigned a home address (referred to as an IP address) associated with its home agent. In addition, a mobile connected to a foreign link acquires a "care-of" address. The mobile IP must register the care-of address with its home agent, using a message exchange defined by the mobile IP RFCs. To prevent denial of service attacks, the registration messages are required to be authenticated. The home agent "advertises" reachability to the network-prefix of the mobile node's home address, thus attracting packets that are destined to the mobile node home address. The home agent intercepts these packets and "tunnels" them to the care-of address that the mobile node registered previously.

If we assume now that mobile 118 moves from its position at RF site 110 to its position at RF site 120, upon making this move, the mobile 118 must change its care-of address from the address of foreign agent 112 to the address of foreign agent 122. This is performed automatically when mobile 118 moves into range of RF tower 124, as described below.

Mobile 118 initiates registration with foreign agent 122 when mobile 118 perceives the IP network change or when mobile 118 receives a foreign agent advertisement from foreign agent 122. In the case of a network change, mobile 118 sends out a broadcast (RF) message requesting foreign agent services, to which foreign agent 122 responds (RF) with a foreign agent advertisement.

In the case of an EDACS system, mobile 118 never sees foreign agent advertisement messages nor does it see a network change because foreign agent advertisements are not broadcast over the RF and because mobile units never see the data traffic of other mobile units. Instead, mobile 118 recognizes a network change when the control channel frequency changes. This occurs when the original frequency coming from tower 114 is lost and the new frequency coming from tower 124 is located.

In either case, registrations continue with the mobile 118 sending a registration request (via RF) to foreign agent 122, which can accept or deny the request for any of a number of known reasons. If foreign agent 122 accepts the request, it creates an entry that maps the IP address of mobile 118 with the machine address (discussed below) of mobile 118 and then forwards the request to home agent 106; otherwise foreign agent 122 sends a "request rejection" (via RF) to mobile 118. After receiving the request acceptance or request rejection, home agent 106 sends a registration accept or reject to foreign agent 122 which forwards the response to mobile 118 (via RF). If home agent 106 accepts the registration request, it now forwards (tunnels) all traffic destined to mobile 118 to foreign agent 122. The foreign agent 122 de-tunnels the traffic and attempts to deliver the IP datagram to mobile 118 using the machine address previously databased.

Each mobile, when it first arrives at an RF site (and optionally at regular intervals) must register with the RF site by sending its LID (machine address) over the control channel (control channel refers to both an RF frequency and hardware/software to service radios that are camped on that frequency). This LID registration (called a LID log-in) occurs as part of a prior art process intended to support voice calls roaming about the EDACS system.

When a mobile moves from one RF site to another RF site, it performs a registration (log-in) with the new site. This registration is typically quite simple. The mobile sends its LID to the RF site in some technology-dependent fashion (for EDACS this is done on the control channel on a LID log-in message).

In an EDACS system, the control channel is in charge of many working channels. In other RF systems to which the present invention applies, the control channel and working channel are often one and the same (for example, TDMA systems where the bandwidth of the channel is divided up between control and working channels). The term "RF site" is intended to encompass either type of system.

In prior art methods, the mobile performs the RF registration process defined above and then has to send an IP mobile registration message, via RF, to the RF site where it can be converted to IP/Ethernet and delivered to the foreign agent destined for the home agent. The RF site-to-foreign agent link and the foreign agent-to-home agent link are IP over Ethernet (i.e., no RF is used). Additionally, the home agent must acknowledge the mobile by sending the registration reply back to the foreign agent destined for the mobile. This uses RF to get from the RF base station to the mobile.

In a worst-case scenario, if the mobile is not in sync (timewise) with the home agent, the mobile will send a registration to the home agent only to be rejected by the home agent, which sends back the correct time value so that the mobile can be synchronized. The mobile then re-requests registration using the new time synchronization value. Once the two are synchronized, the home agent accepts the registration, assuming everything else is okay. Thus, in the best-case scenario, the prior art system uses three RF communications for registration, and in the worst-case scenario, the prior art uses five RF communications.

Figure 2:
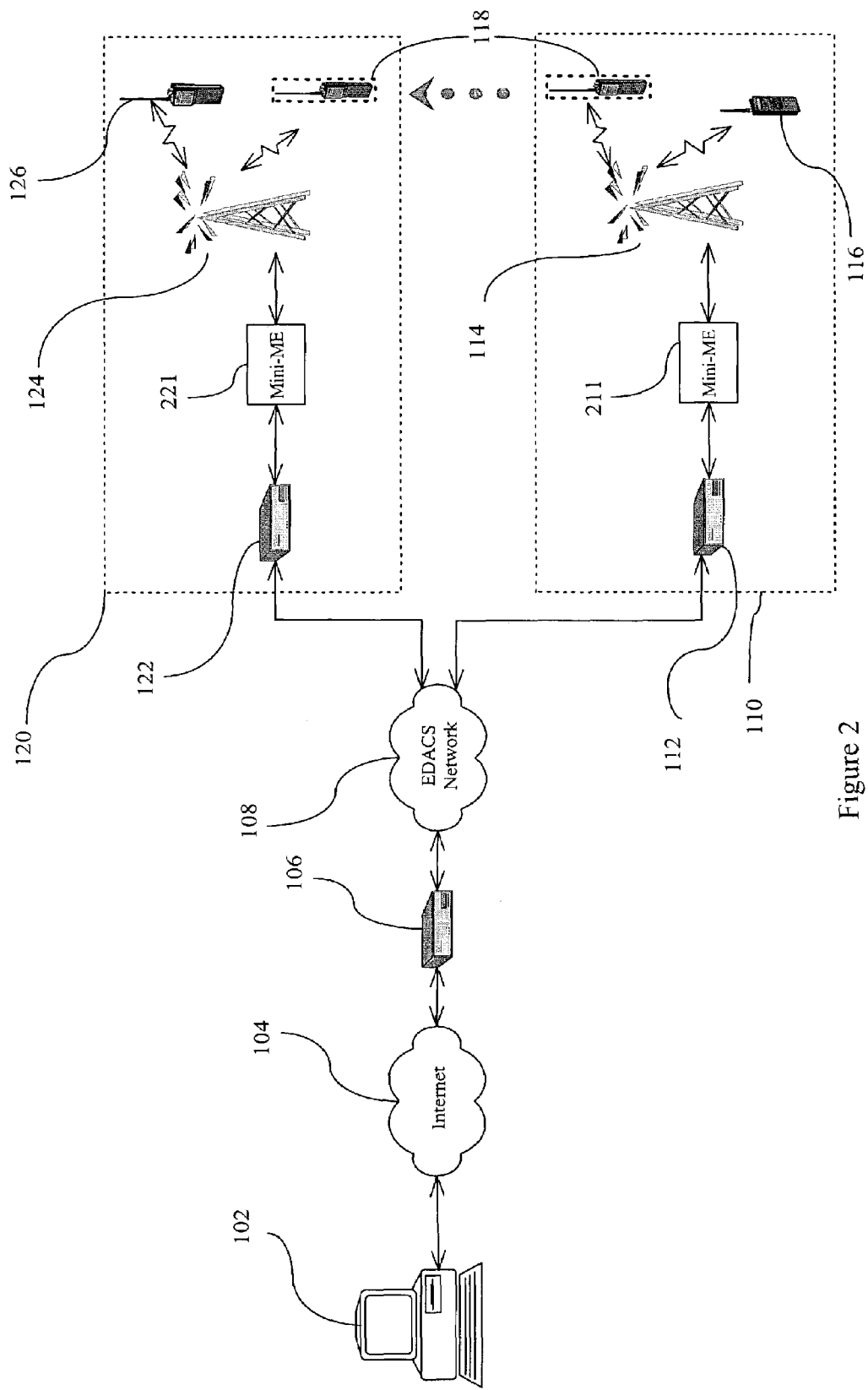
FIG. 2 illustrates the architecture of the present invention.

FIG. 2 illustrates the architecture of the present invention. Like numerals are used in FIG. 2 to denote identical elements illustrated in FIG. 1. As can be seen in FIG. 2, each foreign agent has a proxy, in this example, a Miniature Mobility Exchange (Mini-ME), associated therewith. Specifically, as seen in FIG. 2, site 110 has a Mini-ME 211 coupled between RF tower 114 and foreign agent 112. Similarly, site 120 includes a Mini-ME 221 situated between RF tower 124 and foreign agent 122.

The MME is a logical entity that could be software or hardware and could be implemented on a number of platforms. For instance, one alternate configuration places the MME on the hardware and as part of the software that makes up the EDACS control channel.

The important aspects that comprise the MME are (1) the MME maintains a table of IP-Address-to-mobile-physical-address mappings, a table of IP-Address-to-Home-Agent mappings, and the IP address of the Foreign Agent (FA); (2) the MME has an IP connection over some physical medium to the FA; (3) the MME has some physical connection to the RF site such that it can request or otherwise indicate the destination mobile for a received IP datagram and such that it can deliver that IP datagram to the RF site for subsequent delivery to the mobile; (4) the MME can place IP Mobile Registrations and accept IP Mobile Replys; and (5) the MME has access to IP datagrams received such that it can inspect whether the datagram is destined for one of the mobiles for which the MME is a proxy.

The invention has been implemented in an EDACS system using a PowerPC architecture with AMD fast Ethernet controller hardware, and a Nucleus operating system. Of course, it is understood that the invention is not limited to this implementation and numerous other suitable implementations will be apparent to one of ordinary skill in the art.

The MME uses its link to the RF site to determine when a mobile has roamed into its coverage area. The MME looks up the physical address (LID) of the mobile in its table of IP-Address-to-mobile-physical-address mappings. If found, the MME sends a registration to the Home Agent (HA) associated with that particular mobile. The MME inspects all IP datagrams received to see if they are destined for one of the mobiles for which it is a proxy. When such datagram arrives, the MME uses its link to the RF site to indicate that there is data available for a particular mobile. The MME uses its link to the RF site to deliver the datagram.

In accordance with the present invention, when a mobile attempts a LID log-in over the control channel, the Mini-ME taps into an existing communication between the control channel and other equipment, i.e., the Mini-ME passively "sees" all LID log-ins from mobile devices at the site. For an EDACS system, this is accomplished by listening to the broadcast messages that the Control Channel sends out to the other site equipment. Specifically, there is a message called "login acknowledge" that the MME keys off of. However, if the MME were in the alternate configuration described previously, it would be part of the control channel and would have software access to the messages being received from the radio. Another configuration could have the MME listening to the control channel frequency to see the mobiles registering with the RF Site.

The site equipment (control channel-working channel-Mini-ME- etc.) are connected and communicate via an ethernet LAN. For EDACS systems, the Control Channel, Working Channel, and MME all physically reside together at the RF site. They are connected by a link called the Site LAN. The Call Trunking LAN (CTL) is a logical subset of the messaging that occurs on the Site LAN. The FA also resides at the RF site and is connected to the MME via a link called the Management/Data LAN. In a preferred embodiment, this communication is carried out via a "Control Trunking LAN" or CTL, but it is understood that any type of connection can be used to perform this function, including software interprocess communication, serial links, etc.

The RF logins are broadcast from the control channel (hardware) to all devices on the LAN (including the Mini-ME) via the CTL protocol. The Mini-ME then looks up in a configured IP-Address-to-mobile-physical-address mapping table the IP address associated with the LID that just logged in; looks up in a configured IP-Address-to-Home Agent mapping table the home agent for that IP address; and registers the IP address with the home agent via the Mini-ME's associated foreign agent. The home agent, from that point forward, tunnels all datagrams targeted to the mobile IP's address to the foreign agent, which detunnels them and delivers them to the Mini-ME. The foreign agent "thinks" that the Mini-ME is actually the mobile, because the Mini-ME originated the registration process on behalf of the mobile and it is the Mini-ME machine address that the foreign agent has associated with the mobile's IP address.

The Mini-ME requests a working channel from the control channel for a call between itself and the mobile. The control channel then informs the mobile and the Mini-ME of the assigned working channel and the Mini-ME forwards the datagram to the mobile via the working channel. As the mobile moves from site to site, it must re-register with its home agent, even if it has nothing to send. This is necessary because the host computer may have something to send the mobile. However, no working channels are necessary to log a mobile into an RF site. Mobiles login into the site via the control channel message only.

To summarize the registration process when a mobile moves into range of a new Mini-ME, each time that a mobile moves into the "jurisdiction" of a particular Mini-ME, the Mini-ME registers with the home agent of the mobile via the foreign agent associated with the Mini-ME. This creates a tunnel from the home agent to the foreign agent, so that data intended for the newly-arrived mobile will make its way to the correct foreign agent. The foreign agent already has a connection to the Mini-ME, so there is no need to reestablish a connection between the foreign agent and the Mini-ME. Further, since the Mini-ME has a "local connection" with the newly-arrived mobile, there is no need to use RF for IP mobility registration.

The Mini-ME performs this IP mobility registration process with the appropriate home agent each time a mobile enters or leaves its jurisdiction. Each time that a mobile moves into the jurisdiction of a particular Mini-ME, the Mini-ME registers with the home agent of the mobile via the foreign agent associated with the Mini-ME, thereby updating the home agent with the mobile's new foreign agent (i.e., location). The foreign agent treats the Mini-ME as though it were the mobile and thus delivers any forwarded (tunneled) packets destined to the mobile to the Mini-ME instead.

The registration process between the Mini-ME and the home agent via the foreign agent does not require the use of RF. The registration process between the Mini-ME and the mobile is accomplished via the pre-existing RF "local connection" registration so no additional RF needs to be used. This is in contrast to the prior art, which requires that each mobile register with the appropriate foreign agent when it enters the foreign agent's jurisdiction (using RF) in addition to performing any required RF "local connection" registration. Thus, the present invention cuts down on the use of RF, because the prior need to use RF between the mobiles and the foreign agents to register them when they move is no longer needed; only a single RF communication is needed to complete registration.

The Mini-ME is looking for the mobile identifiers being sent to the RF site. More accurately, the Mini-ME is looking at the output from the site that acknowledges the identifier (e.g., the LID). In EDACS, the control channel outputs each ID, which logs in onto the Ethernet LAN in a proprietary message. The Mini-ME is looking at these proprietary messages. In a more generic system to which this patent also applies, the Mini-ME would listen to the RF itself. In either case, the Mini-ME now has the RF-specific ID of the mobile.

The Mini-ME is also configured with the database that converts an RF-specific ID to an IP address. This allows the Mini-ME to obtain the correct IP address for registering with the home agent. The remainder of the registration process takes place via IP over Ethernet, meaning no RF is used.

Without the Mini-ME, movement to a new site and the re-registration associated therewith requires bringing up a working channel and communicating via the foreign agent to the home agent, assuming that the mobile even knows the IP address of the foreign agent. If, as is usually the case, the mobile doesn't know the foreign agent's IP address, then per the mobile IP RFC, the mobile would typically broadcast out a request (advertisement) for a foreign agent when it first arrived at a new RF site. The foreign agent would then respond with its IP address, after which the mobile could make the request of the home agent via the foreign agent for service. Thus, in the prior art systems, each time a mobile moves to a new site, three RF working channel calls are potentially required, plus the original LID log-in.

Figure 3A:
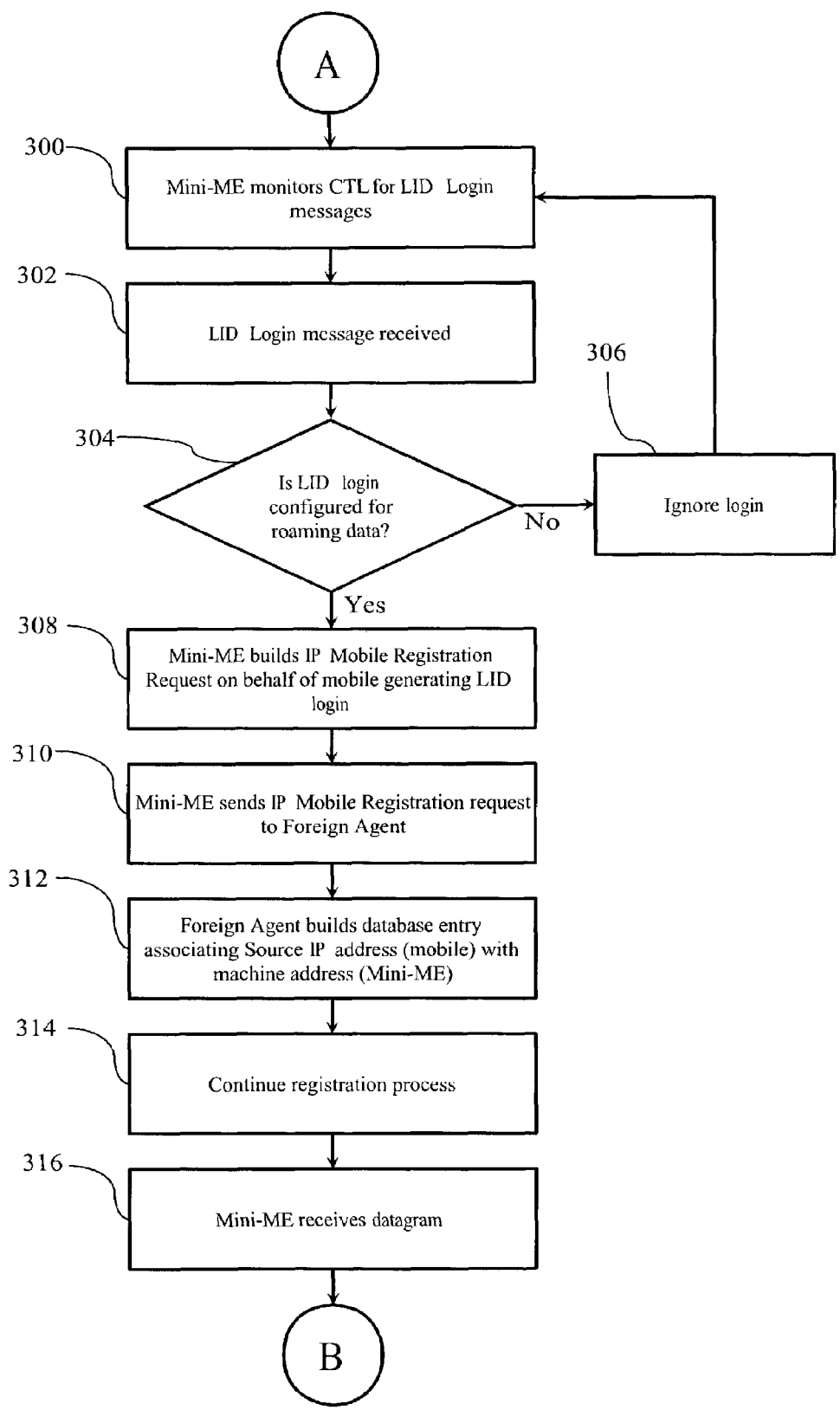
FIGS. 3 (a and b) is a flowchart illustrating an example of the operations performed by the Mini-ME to achieve the benefits of the present invention.
Figure 3B:
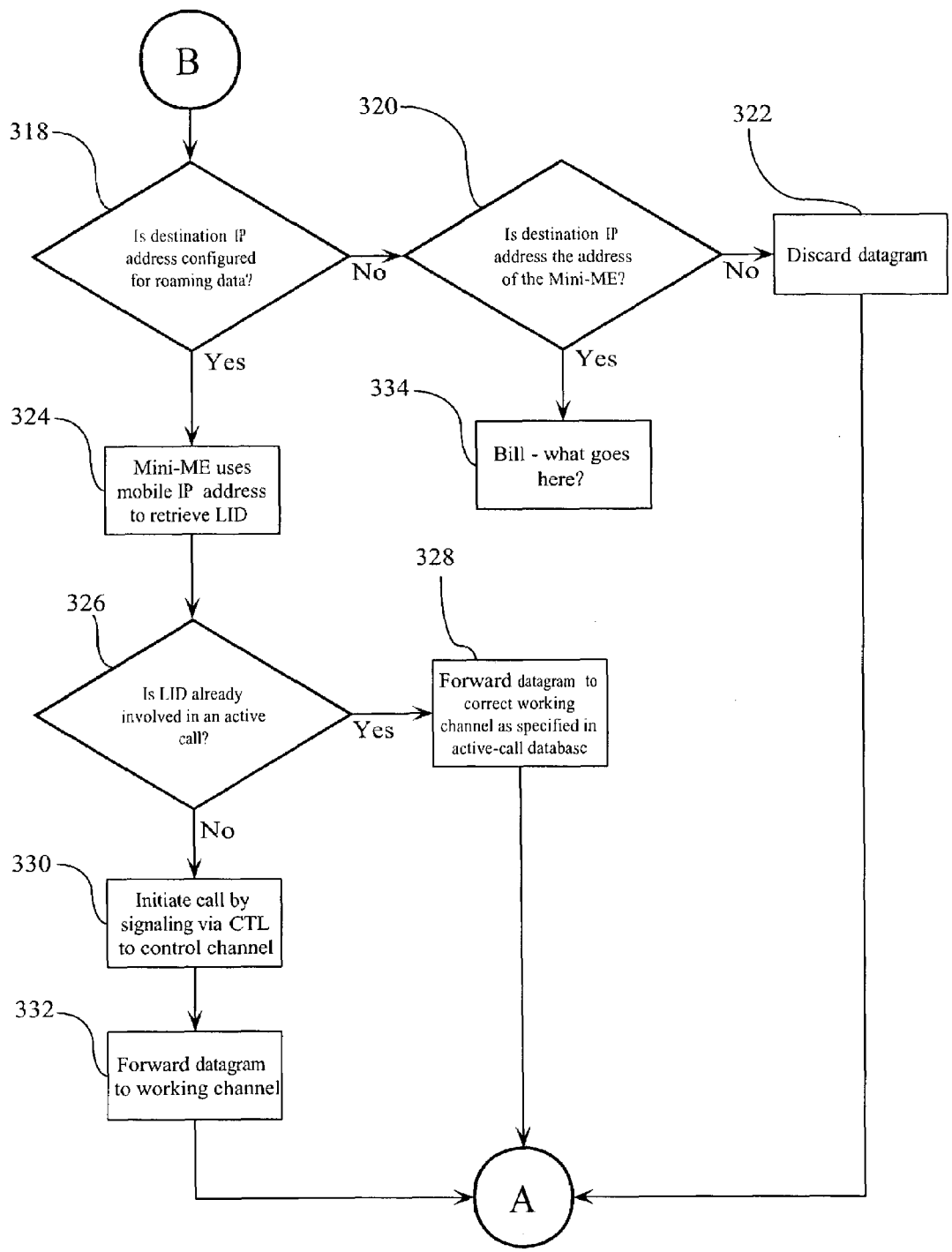

FIG. 3 is a flowchart illustrating an example of the operations performed by the Mini-ME to achieve the benefits of the present invention. Referring to FIG. 3, at step 300, the Mini-ME monitors the CTL for LID log-in messages. This process is constantly occurring in accordance with the present invention.

At step 302, upon receipt of a LID log-in message, the process proceeds to step 304 where it is determined if the LID log-in received is configured for roaming data. This is determined by looking in the Mini-ME configuration. If the LID does not exist in the Mini-ME configuration, then the LID is not configured for roaming data, and the process proceeds to step 306 where the log-in is ignored and the process continues to monitor the CTL for LID log-in messages.

If at step 304, however, it is determined that the LID log-in is configured for roaming data, then at step 308, the Mini-ME builds an IP mobile registration request (CRFC 3344) on behalf of the mobile submitting the LID log-in. The building of the IP mobile registration requires includes the filling in of the import fields of the request as follows:

"Home Address" is set to the mobile's IP address;

"Home Agent" is retrieved from an internal database using "Home Address" as a key;

"Care-of Address" is retrieved from the Mini-ME configuration or obtained via agent advertisement messages per prior art; and "Authentication Extension" fields are also retrieved from an internal database using "Home Address" as a key. The MME is configured via the command line interface (CLI). This is a serial or telnet connection. The configuration information is then stored in non-volatile memory on the MME. A System Administrator or Designer can decide on the IP Address scheme to use that maps the LIDs to IP Addresses for all planned users of the EDACS RF System. This Designer also must decide and configure which Home Agent(s) handle which IP Addresses, etc. The CLI is then used to configure these into the MME.

After filling in the fields of the IP mobile registration request, at step 310, the Mini-ME sends the IP mobile registration request to the foreign agent (at the IP Address configured into the MME via CLI). The IP Header Source Address is set to the mobile's IP address. However, because the Mini-ME originates the message, the machine address of the Ethernet Frame that arrives at the foreign agent is that of the Mini-ME.

At step 312, the foreign agent builds a database entry associating the Source IP Address of the mobile with the machine address of the Mini-ME, and then at step 314, the registration proceeds.

At step 316, when the Mini-ME receives a datagram, a determination is made (at step 318) as to whether or not the destination IP address is configured for roaming data. If the destination IP address is not configured for roaming data, the process proceeds to step 320 to determine if the destination IP address is the same as that of the Mini-ME. If, at step 320, it is determined that the destination IP address is not that of the Mini-ME, then the process proceeds to step 322 where the datagram is discarded and then the process proceeds back to step 300 where the Mini-ME monitors the CTL for LID log-in messages.

If, at step 320, it is determined that the destination IP address is the address of the Mini-ME, then at step 334 a normal IP Protocol Stack operation is performed, i.e., some other application on the MME is receiving a message.

If, at step 318, it was determined that the destination IP address is configured for roaming data, then the process proceeds to step 324, where the Mini-ME uses the mobile IP address to retrieve the LID. At step 326, a determination is made as to whether or not the LID is already involved in an active call. This is determined by checking the active call database. The MME builds the Active Call Database over time. It starts out empty; when an IP datagram is received, a destination entry is added with a status of "call requested." A call request is made of the control channel and when a reply is received (called a "channel assignment" message), the status (if successful) is changed to "in program" and a working channel number (received in the channel assignment message) is added to the entry. The entry is deleted when a "channel drop" message is received. If the LID is already involved in an active call, then the datagram is forwarded to the correct working channel as specified in the active call database (step 328). If, at step 326 it is determined that the LID is not already involved in an active call, then at step 330, the call is initiated by signaling the control channel via a CTL, and then, when the control channel assigns a working channel to the call, at step 332, the datagram is forwarded to the working channel. Once this has been completed, the process proceeds back to step 300 for continual monitoring of the CTL for LID log-in messages.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a proxy device such as a MiniME. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Using the above-described process, the number of RF working channels required to be used are minimized, thereby maximizing the efficiency of operation of the entire system.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. A method of registering one or more mobile devices with a foreign agent and home agent, comprising the steps of:
    providing a proxy device between said foreign agent and said one or more mobile devices;
    establishing a local connection between said proxy device and said one or more mobile devices; and
    sending registration messages from said proxy device to said home agent via said foreign agent, on behalf of said one or more mobile devices, wherein each of said registration messages associates a care-of address of said foreign agent with an IP address of said one or more mobile devices, thereby registering each of said one or more mobile devices with said home agent.

2. The method of claim 1, further comprising the step of:
    establishing a local connection between said proxy device and any mobile device that moves into operational range of said proxy device.

3. The method of claim 2, further comprising the step of:
    sending a de-registration message from said proxy device to said home agent via said foreign agent, whenever a mobile device moves out of operational range of said proxy device.

4. The method of claim 1, wherein said step of sending registration messages includes at least the steps of:

said proxy device building a registration request on behalf of each mobile device generating a login message that is received by said proxy device;
said proxy device sending said registration request to said foreign agent.

5. The method of claim 4, wherein said step of sending registration messages further includes at least the step of:
said foreign agent building a database entry associating an identifier of each of said one or more mobile devices with an address of said proxy device, whereby any data from said home agent destined for one or more of said mobile devices is directed to said proxy device via said foreign agent based on said mobile device identifier.

6. A system for registering one or more mobile devices with a foreign agent and home agent, comprising:
a proxy device coupled between said foreign agent and said one or more mobile devices, said proxy device configured to:
establish a local connection between said proxy device and said one or more mobile devices; and
send registration messages from said proxy device to said home agent via said foreign agent, on behalf of said one or more mobile devices, wherein each of said registration messages associates a care-of address of said foreign agent with an IP address of said one or more mobile devices, thereby registering each of said one or more mobile devices with said home agent.

7. The system of claim 6, wherein said proxy device is further configured to:
establish a local connection between said proxy device and any mobile device that moves into operational range of said proxy device.

8. The system of claim 7, wherein said proxy device is further configured to:
send a de-registration message from said proxy device to said home agent via said foreign agent, whenever a mobile device moves out of operational range of said proxy device.

9. The system of claim 1, wherein said proxy device is further configured to:
build a registration request on behalf of each mobile device generating a login message that is received by said proxy device; and
send said registration request to said foreign agent.

10. The system of claim 9, wherein said foreign agent is configured to:
build a database entry associating an identifier of each of said one or more mobile devices with an address of said proxy device, whereby any data from said home agent destined for one or more of said mobile devices is directed to said proxy device via said foreign agent based on said mobile device identifier.

11. A computer program product recorded on computer-readable medium for registering one or more mobile devices with a foreign agent and home agent using a proxy, comprising:
computer-readable means for establishing a local connection between said proxy and said one or more mobile devices; and
computer-readable means for sending registration messages from said proxy to said home agent via said foreign agent, on behalf of said one or more mobile devices, wherein each of said registration messages associates a care-of address of said foreign agent with an IP address of said one or more mobile devices, thereby registering each of said one or more mobile devices with said home agent.

12. The computer program product of claim 11, further comprising:
computer-readable means for establishing a local connection between said proxy and any mobile device that moves into operational range of said proxy.

13. The computer program product of claim 12, further comprising:
computer-readable means for sending a de-registration message from said proxy to said home agent via said foreign agent, whenever a mobile device moves out of operational range of said proxy.

14. The computer program product of claim 11, wherein computer-readable means for sending registration messages includes at least:
computer-readable means for building a registration request on behalf of each mobile device generating a login message that is received by said proxy; and
computer-readable means for sending said registration request to said foreign agent.

15. The computer-program product of claim 14, wherein said computer-readable means for sending registration messages further includes at least:
computer-readable means for building a database entry associating an identifier of each of said one or more mobile devices with an address of said proxy, whereby any data from said home agent destined for one or more of said mobile devices is directed to said proxy via said foreign agent based on said mobile device identifier.

* * * * *